(No Model.) 2 Sheets—Sheet 1.

T. WILLIAMS, Jr.
MEAT CUTTER.

No. 563,899. Patented July 14, 1896.

Witnesses
H. van Dedennee
Otto Munk

Inventor
Thomas Williams Jun.
by Richard
Attorneys (No Model.) 2 Sheets—Sheet 2.
T. WILLIAMS, Jr.
MEAT CUTTER.
No. 563,899. Patented July 14, 1896.
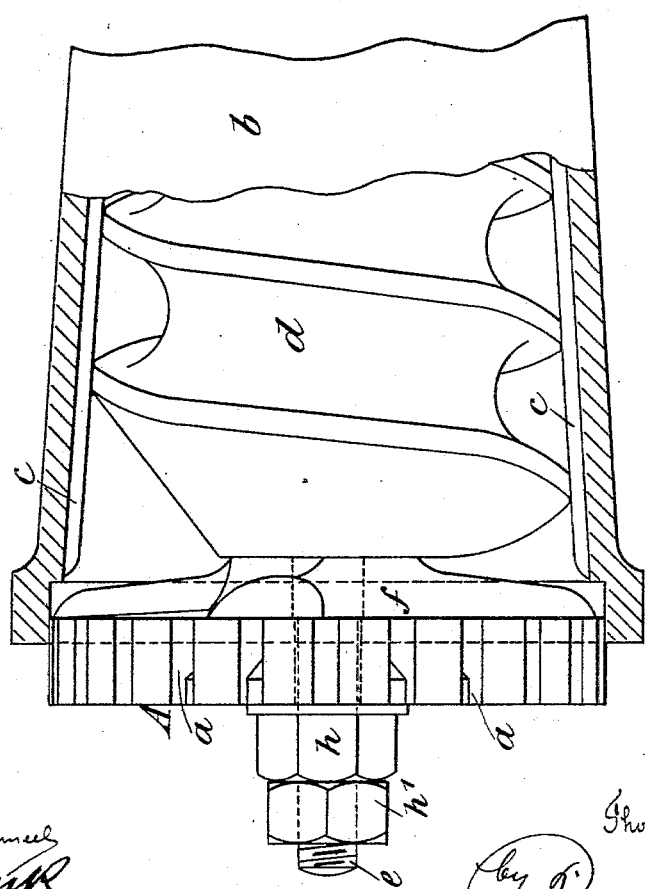

UNITED STATES PATENT OFFICE.

THOMAS WILLIAMS, JR., OF LONDON, ENGLAND.

MEAT-CUTTER.

SPECIFICATION forming part of Letters Patent No. 563,899, dated July 14, 1896.

Application filed December 26, 1895. Serial No. 573,318. (No model.)

*To all whom it may concern:*

Be it known that I, THOMAS WILLIAMS, the younger, engineer, a subject of Her Majesty the Queen of Great Britain and Ireland, residing at Bay Tree Cottage, Church End, Finchley, London, in the county of Middlesex, England, have invented a certain new and useful Meat-Cutter, of which the following is a specification.

In the specification to my United States of America Patent No. 440,215 there is described a machine for cutting up meat and like plastic or yielding substances wherein the cutting is effected by means of a revolving knife acting in conjunction with a cutting-plate having sharp-edged grooves or channels formed in its face, the said grooves or channels converging toward and leading to a delivery or outlet aperture extending through the center of the said plate.

The present invention is designed to improve upon the above-mentioned cutting device and to render the machine more rapid in action and easier to work. This I effect by the employment of a grooved or channeled cutting-plate of the peculiar construction and arrangement hereinafter described. According to my invention, I so construct and arrange the grooves or channels in the said cutting-plate as to cause them to deliver the cut-up meat around the periphery thereof in lieu of through a central aperture therein, said grooves or channels preferably deepening as they approach the periphery of the plate in lieu of getting deeper toward the center thereof, as in the previous arrangement. The said grooves or channels may be of equal width throughout, or they may increase in width as they approach the periphery of the plate. The meat or other substance cut up being delivered all round the periphery of the plate in lieu of being delivered through an aperture in the center thereof, it is obvious that there will be less resistance or obstruction to its exit and that the machine will consequently work more quickly and easily, while at the same time all the advantages of the perfect scissor-cut afforded by the use of a grooved or channeled cutting-plate are retained.

My invention further relates to a shutter device in the form of a perforated ring applied round the periphery of the cutting-plate, whereby the outlets by which the meat is delivered when cut up may be reduced in size as desired. The delivery may thus be more or less retarded, if necessary, as when fine-cut meat is required, for example.

Figure 1:
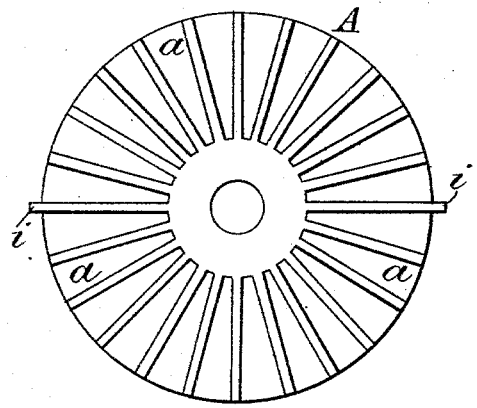
Figure 2:
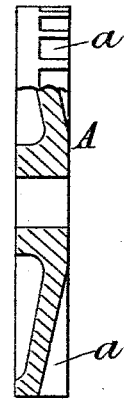
Figure 3:
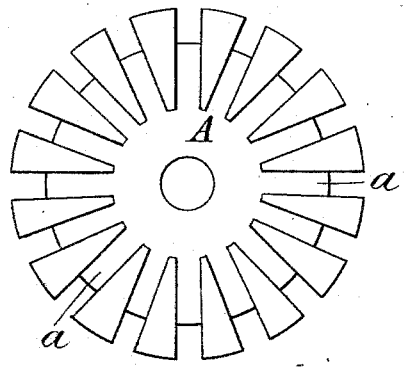
Figure 4:
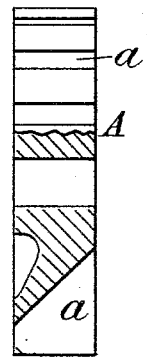
Figure 5:
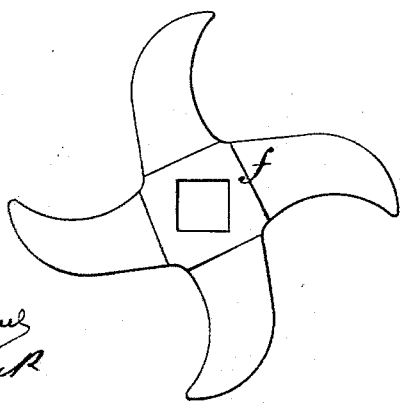
Figure 6:
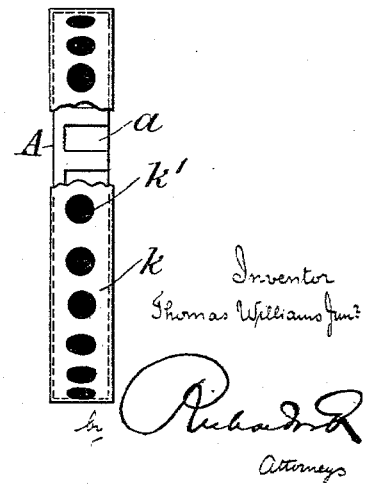

In the accompanying drawings, in which similar letters refer to like parts in all the figures, Figure 1 is a front view, and Fig. 2 is a part sectional edge view, of the cutting-plate. Figs. 3 and 4 are similar views of a cutting-plate of slightly-modified construction. Fig. 5 shows a convenient form of revolving knife. Fig. 6 shows the shutter device. Fig. 7 is a longitudinal section of the delivery end of a meat-cutter having my invention applied thereto. Fig. 8 is a sectional edge view of the cutting-plate represented in Fig. 7, the face view of which plate would be similar to Fig. 3.

A is the cutting-plate, and *a* are the grooves or channels formed in the face thereof, said grooves or channels leading to the periphery of the plate A and preferably deepening as they approach the same. In Fig. 1 the grooves or channels *a* widen as they approach the periphery of the plate, while in Fig. 3 they are represented as of the same width throughout. In this last-mentioned figure also and in Fig. 8 it will be noted that the grooves or channels are cut right through the cutting-plate A at the periphery thereof, and this construction of the grooves or channels will be found useful when extremely quick delivery is desired and when a fine cut is not needed.

The face of the cutting-plate A is ground and faced true, so as to impart sharp cutting edges to the grooves or channels *a* therein, and the cutting up of the meat is effected in a similar manner to that described in the specification to my above-mentioned Patent No. 440,215—viz., by means of a knife revolving in cutting contact with the face of the said cutting-plate, the meat being forced against the grooved or channeled face of the cutting-plate by a forcing-screw or equivalent device and being severed by a succession of perfect scissor-cuts as fast as it enters the said grooves or channels.

In Fig. 7, which shows the application of my invention to a meat-cutter, *b* is the delivery end of usual casing, having the well-known longitudinal (or spiral) internal ribs

*c*. *d* is the forcing-screw, upon the axis *e* of which is mounted so as to revolve therewith the knife *f*, the blades of which are preferably curved or of scimitar shape, as shown in Fig. 5. The said axis *e* of the forcing-screw passes through a central aperture formed for its reception in the cutting-plate A, which latter closes the delivery end of the casing *b*, and said axis *e* is screw-threaded at its end to receive the adjusting-nut *h* and lock-nut *h'*, whereby the cutting-plate is held in place and its proper adjustment in relation to the knife *f* is maintained. The cutting-plate A must project sufficiently beyond the end of the casing *b*, as illustrated, to permit of the peripheral delivery of the cut meat outside of said casing. *i i* are projections on the cutting-plate A, which enter corresponding recesses in the casing *b* and which prevent the said cutting-plate from revolving with the knife *f*.

In Fig. 6 *k* is a ring having perforations *k'*, formed around it. This ring *k* may be applied around the periphery of the plate A, fitting the same closely, yet free to be turned thereon, and acts as a shutter whereby the outlet-apertures around the periphery of A may be more or less obstructed or reduced in size, for the purpose above mentioned, by turning the ring on the plate, as will be clearly understood on referring to the drawings.

Although in the drawings I have represented the grooves or channels *a* as being radial and straight, I do not confine myself to this precise arrangement, since tangential curved or bent grooves may be employed, provided they deliver the cut meat around the periphery of the cutting-plate. I prefer, however, the arrangement illustrated.

What I claim, and desire to secure by Letters Patent of the United States, is—

1. A meat-cutter comprising a casing, a cutting-knife therein, a cutting-plate, means for forcing the meat to the cutting plate and knife, said cutting-plate having discharge-grooves extending outwardly to and opening at its periphery, substantially as described.

2. A meat-cutter comprising a casing, a cutting-knife and cutting-plate at the end thereof and means for forcing the material against the cutting-plate, said plate having discharge-grooves, the bottoms of which incline outwardly toward the periphery of the plate, substantially as described.

3. In combination, the casing, the cutting-knife and cutting-plate, the latter having the discharge-grooves in its inner face extending to and opening at the periphery of the plate and a perforated shutter or ring arranged to control the openings of the cutting-plate.

In witness whereof I have signed my name to this specification in the presence of two subscribing witnesses.

THOMAS WILLIAMS, JUNR.

Witnesses:
W. HANCHARD,
CECIL ARTHUR ELLIS.